July 24, 1962  F. FLOYD  3,045,410
FILTERS

Filed Nov. 16, 1959  2 Sheets-Sheet 1

INVENTOR
FREDERICK FLOYD
BY Lawson and Taylor
ATTORNEY

INVENTOR
FREDERICK FLOYD

United States Patent Office 3,045,410
Patented July 24, 1962

3,045,410
FILTERS

Frederick Floyd, Strood, England, assignor to Azonair Engineering Company Limited, Azonair Works, The Esplanade, Rochester, England
Filed Nov. 16, 1959, Ser. No. 853,298
Claims priority, application Great Britain Nov. 14, 1958
7 Claims. (Cl. 55—352)

This invention relates to fluid filters and particularly but not exclusively to fabric filters employing expendable roll of filter material operated automatically or by hand.

There are many types of filters known at present, the most common one comprising a straight curtain of filter material presented normal to the direction of air flow. As the material becomes dirty it is taken up by a spool situated at the base of the filter and driven by a geared motor, or by hand. In such a filter the greatest ratio of filter face velocity to filter material velocity is one.

It is, however, desirable to attain the greatest ratio possible in any given filter since this results in greater benefits of efficiency, larger air volumes and smaller and cheaper filtration plant, and to this end another filter has been proposed in British co-pending specification No. 11,859/58, and also in prior specification No. 551,815, of January 27, 1942, in which the filter material travels through a horizontal V-shaped path, thus exposing more filter material area to the air flow.

The principal object of this invention is to increase the ratio of face velocity to material velocity still further, within equivalent envelope dimensions, and so to derive greater benefits of efficiency, larger air volumes, and smaller and cheaper filtration plant.

Another object is to provide positive end sealing of the material to the filter casing.

Another object is to provide the filter material with beaded edges to co-operate with grooves on the ends of said rollers and with said casing to form a fluid-tight seal as said rollers are pressed against each other under the tension of the filter material as it is wound on to said receiving roll, and so to overcome the problem of adequate sealing during movement of the filter material.

Another object is to provide easy access of filter material through the perforated rollers during initial loading. This is done by arranging that each perforated roller bearing is slotted so as to enable it to be moved in relation to the other rollers.

Further objects are to provide less friction of the filter material through the filter particularly to make manual operation of the filter easier, and to enable larger filters to be so operated, while another object is to provide for easier arrangements of the positioning of the clean and dirty filter material rolls on the same side of the filter even with increasing height increments.

According to the present invention there is provided a filter for the continuous filtering of a fluid such as air, comprising a filter casing and filter material supported therein and separating the clean air side from the dirty air side thereof, and comprising a plurality of fluid-permeable support rollers, for supporting filter material, rotatably mounted in contact with each other along parallel axes, and further comprising filter material, in strip form arranged to be fed from a supply roll and to be taken up by a receiving roll, said filter material passing between the gap of said rollers to follow, and to be supported over the entire length of an extended path.

The edges of said filter material may be supported by moving member without sliding friction, and the filter material is preferably provided with beaded edges to co-operate with grooves on the ends of said rollers and with said casing to form a fluid-tight seal as said rollers are pressed against each other under the tension of the filter material as it is wound on to said receiving roll.

The support rollers are preferably cylindrical and may be mounted in slotted bearings and the filter material is pinched at least at one point of its extended path, while the supply and receiving rolls are preferably both mounted on the clean air side of said filter, a flexible blade being interposed between said filter casing and adjacent support rollers to provide a fluid-tight seal.

The filter material may be advanced automatically by control and drive means according to changes in the pressure drop across said filter caused by the accumulation of impurities on said filter material.

Two embodiments of the invention will now be particularly described by way of example with reference to the accompanying drawings, in which.

Figure 1:
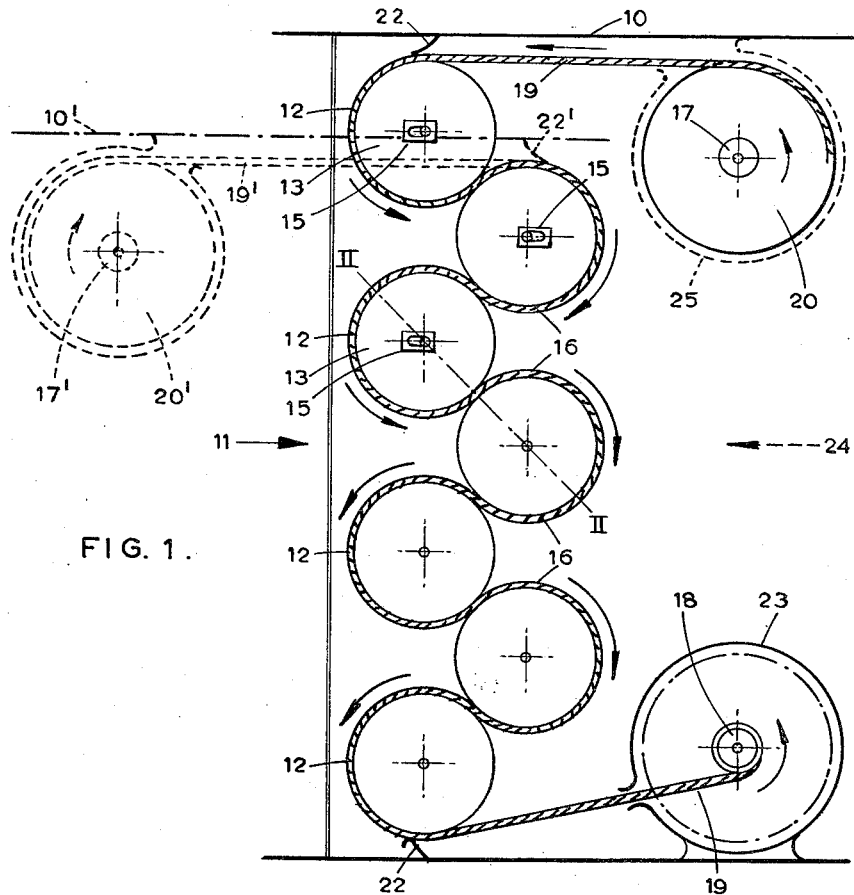
FIGURE 1 is a diagrammatic longitudinal sectional elevation of a first embodiment of a filter according to the present invention.
Figure 2:
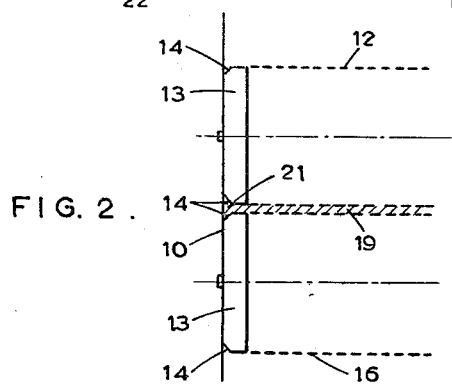
FIGURE 2 is a diagrammatic fragmentary sectional end view of one side of the filter, the section being taken along the line II—II of FIGURE 1.

Referring to FIGURES 1 and 2, the filter comprises a casing 10 in the form of a rectangular box open at opposite ends and made of sheet material, through which air to be purified is made to pass, dirty air entering on one side, and clean air issuing on the other side, as shown by the direction of the air flow arrow 11.

Four air permeable cylindrical rollers 12 made of expanded metal mounted on solid circular end plates 13 having chamfered edges 14 are arranged in spaced relation across the filter and are rotatably and slidably mounted in bearing members 15 which are slotted horizontally. The slotted bearing members 15 enable lateral movement of the rollers 12 to take place so that access can be gained to the space between these four rollers 12 and a second set of three identical rollers 16 arranged in identical bearing members 15 in the spaces between the first four rollers 12, also in a vertical plane, but offset from the first four rollers 12, and on the air exit side thereof.

In addition there exists longitudinal movement along the axis of the rollers 12 and 16 by live end discs in the form of spring loaded mechanisms.

A supply spool 17 and a take-up spool 18 for filter material 19 are provided on the air exit side near the top and bottom rollers, and filter material extends from a supply roll 20 supported on the supply spool 17 over the first roller 12 around it and over the topmost of the set of three rollers 16, around this and over the second of the set of four rollers 12, and so on to follow an extended path before being taken up by the take-up spool 18.

The filter material 19 used is made of a strip of filter fabric as wide as the rollers are long, and having beaded edges 21 capable of co-operating with the chamfered edges 14 of the rollers 12 and 16 and the filter casing 10 to form a fluid-tight seal. During rotation of the rollers 12 and 16 the beaded edge 21 is pressed together at the point of roller contact and therefore fills the groove formed by the chamfered edges 14 and the filter casing 10. This occurs on all rollers 12 and 16 and ensures positive sealing. Flexible blades 22 extending from the top and bottom of the filter casing 10 and making loose and resilient contact with the top and bottom rollers 12 furnish a fluid-tight seal with the filter material 19 when it is in place over the rollers 12.

The take-up spool 18 is driven by an electric motor which is energised by an arrangement forming the subject of co-pending British application No. 23,506/59 when the pressure drops across the filter reaches a predetermined value under the action of impurities collected on the filter material 19.

Since the take-up spool 18 for used filter material 19 is situated on the clean air side of the filter, a cover 23 is advantageously provided to prevent any particles of dirt trapped in the used filter material 19 from becoming entrained in the stream of clean air issuing from the filter.

Operation of the filter begins with the loading of a clean roll 20 of filter material 19 in position on the supply spool 17. The projecting end of the filter material 19 is fitted by hand underneath the upper flexible sealing blade 22 situated on top of the uppermost roller 12. The material is then threaded between each succeeding pair of rollers 12 and 16, and as the filter material 19 is passed between the rollers 12 and 16 the gap made to provide access is closed by the tension of the filter material 19 as it is passed under the lowest roller 12 and past the lower sealing blade 22 on to the take-up spool 18.

When the filter pressure drop has risen to a predetermined value due to the collection of dust on the filter material 19, the take-up spool 18 is rotated by the electric motor, and a length of dirty filter material 19 is collected, the filter thus having cleaned itself automatically. This operation may also be carried out manually where desirable, or in dependence of time, for example, by an electric motor controlled by a time switch.

The air to be filtered is forced to pass through the filter material 19 first and then through the air-pervious rollers 12 in the case of the first line of four rollers 12, while in the case of the second set of three rollers 16 the air passes first through the rollers 16 and then through the filter material 19. There can be no by-passing of the filter because of the flexible blades 22 at the top and bottom edges of the filter, while the beaded edge 21 co-operating with the chamfered roller edges 14 and the filter casing 10 ensures positive sealing as the beaded edge 21 is compressed at the points of roller contact to fill the groove formed by the chamfered roller edges 14.

It will be appreciated that when the filter is to be used for purifying an air stream moving in the opposite direction, as indicated at 24, the roll 20 of clean material 19 will be situated in a stream of unpurified air. In such a case a cover 25 is provided to protect the filter material 19.

When there are no limitations of space, the supply roll 20 may of course advantageously be arranged on the clean air side of the filter, as generally indicated in dotted lines and by the numerals 10′, 17′, 20′ and 22′.

Figure 3:
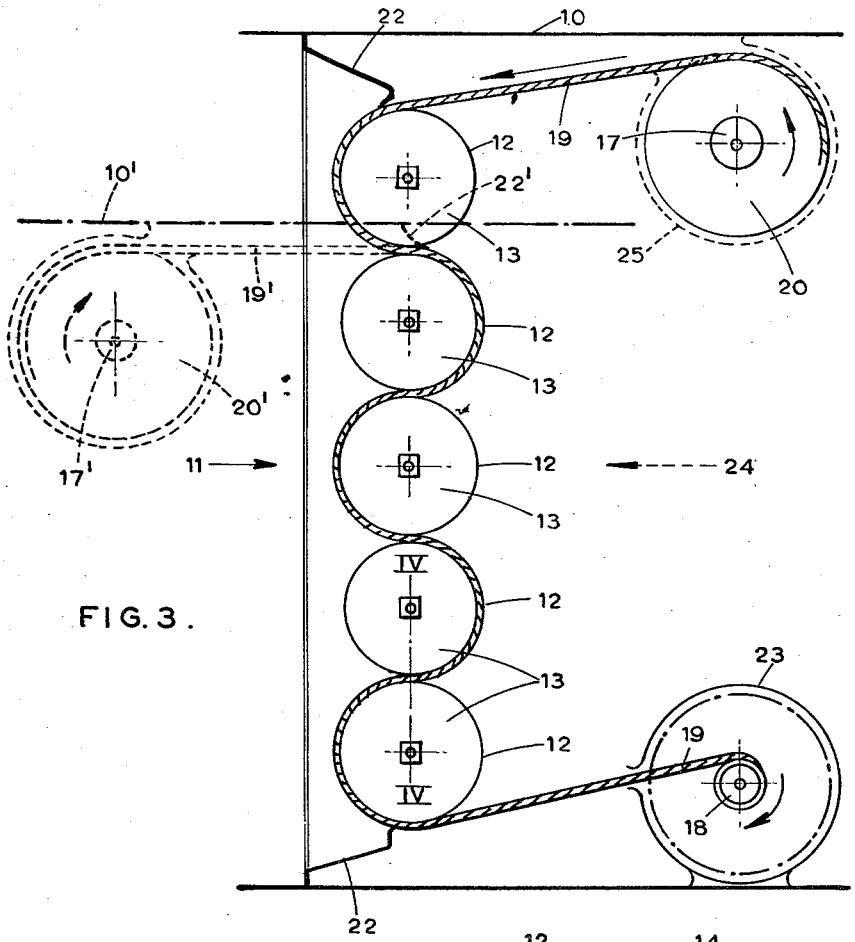
FIGURE 3 is a diagrammatic longitudinal sectional view of a second embodiment.
Figure 4:
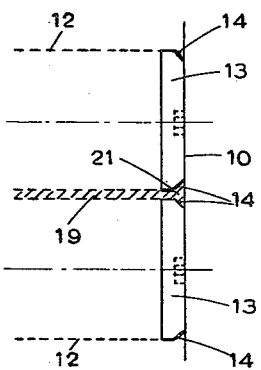
FIGURE 4 is a diagrammatic sectional end view of one side of the filter along the line IV—IV of FIGURE 3.

In a second embodiment shown in FIGURE 3 and FIGURE 4, all the air permeable rollers 12 of an air filter similar to the one hereinabove described are arranged in a straight line rather than in two ranks in order to save space. The filter functions in precisely the same manner as the filter described with reference to FIGURE 1 and FIGURE 2, and modifications for operation with a reversed air flow may of course be similarly provided as indicated in broken lines.

It will be appreciated that besides giving an increased ratio of face velocity to material velocity, filters according to the invention provide positive end sealing between the filter material and the filter casing, while at the same time offering less frictional resistance to the passage of the filter material through the filter, thus making the manual operation of the filter much easier. Ease of access to the filter material through the air permeable rollers during initial loading is also achieved.

Although mention has been made of rollers built of expanded metal, they can of course be constructed of other materials giving a high percentage of free area, for example of woven wire.

I claim:

1. Apparatus for a continuous filtering of a fluid such as air comprising a casing in which fluid will flow along a path from a high pressure side to a low pressure side in said casing and a filter mounted transversely in said casing separating the high pressure side from the low pressure side, said filter comprising a plurality of fluid permeable support rollers rotatably mounted across the fluid path in said casing on parallel axes, each support roller being in contact with at least one other support roller along tangential lines all lying substantially in one plane normal to the general direction of fluid flow in the casing, a strip of filter material fed from a supply roll and taken up by a receiving roll and threaded between the nips of said rollers and supported on said rollers over an extended path across said casing between said high pressure side and said low pressure side.

2. A filter as claimed in claim 1, wherein said filter material is provided with beaded edges to co-operate with said rollers and with the walls of said casing to form a fluid-tight seal around said filter as said rollers are pressed against each other under the tension of the filter material.

3. Apparatus claimed in claim 1, wherein the edges of said filter material are supported by moving members without sliding friction.

4. A filter as claimed in claim 1, wherein the filter material is pinched at least at one point of said extended path.

5. Apparatus in claim 1, wherein at least one of said support rollers is mounted in slotted bearings.

6. Apparatus claimed in claim 1 wherein said supply and receiving rolls are both mounted on the low pressure side of said filter.

7. Apparatus of claim 1 wherein a flexible blade is interposed between said filter casing and adjacent support rollers substantially in the said plane thereby providing a fluid tight seal radial to said adjacent rollers.

References Cited in the file of this patent

UNITED STATES PATENTS

| | | |
|---|---|---|
| 1,377,191 | Eddy | May 10, 1921 |
| 1,783,181 | Birkholz | Dec. 2, 1930 |
| 2,030,552 | Strindberg | Feb. 11, 1936 |
| 2,206,297 | Curley | July 2, 1940 |
| 2,218,453 | Mickle | Oct. 15, 1940 |
| 2,808,899 | Hofstetter | Oct. 8, 1957 |
| 2,869,680 | Fields | Jan. 20, 1959 |

UNITED STATES PATENT OFFICE
CERTIFICATE OF CORRECTION

Patent No. 3,045,410

July 24, 1962

Frederick Floyd

It is hereby certified that error appears in the above numbered patent requiring correction and that the said Letters Patent should read as corrected below.

In the grant, line 2, for "Azonair Engineering Company Limited, of Azonair Works" read -- Ozonair Engineering Company Limited, of Ozonair Works --; line 12, for "Azonair Engineering Company Limited, its successors" read -- Ozonair Engineering Company Limited, its successors --; in the heading to the printed specification, lines 3 and 4, for "Azonair Engineering Company Limited, Azonair Works" read -- Ozonair Engineering Company Limited, Ozonair Works --.

Signed and sealed this 14th day of May 1963.

(SEAL)
Attest:

ERNEST W. SWIDER
Attesting Officer

DAVID L. LADD
Commissioner of Patents